United States Patent [19]

Ide et al.

[11] Patent Number: 4,876,618

[45] Date of Patent: Oct. 24, 1989

[54] METHOD FOR DETECTING ZERO TRACK

[75] Inventors: Jun Ide; Tomoo Iizumi, both of Furukawa, Japan

[73] Assignee: Alps Electric Co., Ltd., Japan

[21] Appl. No.: 94,295

[22] Filed: Sep. 8, 1987

[30] Foreign Application Priority Data

Nov. 22, 1986 [JP] Japan ............................ 61-277820

[51] Int. Cl.$^4$ ..................... G11B 5/55; G11B 21/08
[52] U.S. Cl. ........................ 360/78.13; 360/75; 318/696
[58] Field of Search .............. 360/75, 77, 78, 78.04, 360/78.08, 78.13, 78.14, 77.02, 77.07, 77.08, 77.11; 318/685, 696

[56] References Cited

U.S. PATENT DOCUMENTS

| | | | |
|---|---|---|---|
| 3,956,766 | 5/1976 | Hanson et al. | 360/78 |
| 4,086,636 | 4/1978 | Cizmic et al. | 360/75 |
| 4,593,329 | 6/1986 | Hayakawa | 360/75 |
| 4,628,380 | 12/1986 | Quackenbush | 360/78 |
| 4,633,345 | 12/1986 | Keener | 360/77 |
| 4,683,504 | 7/1987 | Cantello et al. | 360/78 |
| 4,685,007 | 8/1987 | Nazarian et al. | 360/78 |
| 4,691,252 | 9/1987 | Okada et al. | 360/75 |
| 4,754,343 | 6/1988 | Cascio, Sr. et al. | 360/77 |

FOREIGN PATENT DOCUMENTS 0154085 9/1985 European Pat. Off. .

OTHER PUBLICATIONS

IBM TDB vol. 19, No. 4, "Head to Track Synchronizing Mechanism for Magnetic Disks" Porter et al., 9/76, pp. 1393-1395.

Primary Examiner—Alan Faber
Assistant Examiner—Steven R. Garland
Attorney, Agent, or Firm—Guy W. Shoup; Paul J. Winters

[57] ABSTRACT

A magnetic disk drive device includes a rotatable disk. The disk has at least data tracks and guard band tracks. The data is previously recorded on the data tracks in the reversed magnetization form, whereas no data is recorded on the guard band track. While the magnetic head seeks the data from the tracks, the data is detected at first from the data track. This position where the first data is detected is recognized as a zero track. The magnetic head data seeking is performed based upon this zero track which is electronically detectable.

3 Claims, 4 Drawing Sheets

METHOD FOR DETECTING ZERO TRACK

BACKGROUND OF THE INVENTION

1. Field of the Invention

The present invention relates to a method for detecting a zero track position suitable for a disk drive device for recording and/or reproducing information on and-/or from an information recording medium in a disk shape, particularly to such a detecting method for a so-termed "hard disk device" in which a recording medium is stored in a closed chamber and rotated at a high speed.

2. Description of the Prior Art

Various types of disk devices have been widely utilized. In particular, a hard type magnetic disc device is normally used if a compact disk and a large data storage capacity are required. In these magnetic disk devices, a high seek speed and seek accuracy are the most significant matters because the rotation speed of the magnetic disk is very high and the data recording, or storage density is high. While seeking, the zero track position at the outermost portion of the magnetic disk is used as a reference position, so that the precise detection for the zero track position is necessarily required in the magnetic disk device.

A typical hard disk device is illustrated in FIG. 4. The hard disk device mainly includes a magnetic disk 1 for recording information; a magnetic head 2 for recording and reproducing the information on and from the disk 1; a direct drive motor (simply referred to as a "DD" motor, not shown) for rotating the magnetic disk 1; and a head drive mechanism for transporting the magnetic head 2 to a predetermined track on the magnetic disk 1. The hard disk device further includes a base plate 5 functioning as a housing base for storing the magnetic disk 1 and the magnetic head 2, and for holding them under the closed condition; a printed circuit board 6 on which a motor drive circuit, a control circuit and so on are fabricated; and a frame (not shown) for mounting the printed circuit board 6 on the base plate 5.

In the magnetic disc apparatus shown in FIG. 4, two sheets of the magnetic disc 1 are employed, and a magnetic head 2 is employed for each magnetic recording surface of a single disk 1. That is to say, four magnetic heads 2 are employed in total because both surfaces of a single disk 1 are used for recording the information thereon. These magnetic heads are mounted via a cantilever support spring on a swing arm 8 of the head drive mechanism 4. The head drive mechanism 4 is constituted by this swing arm 8, a steel belt 9 partially mounted on the swing arm 8; a pulley 10 for winding an intermediate portion of the steel belt 9 thereon; and a stepping motor 11. The pulley 10 on which the steel belt 9 is wound, is inserted into the drive shaft of the stepping motor 11 and fixed thereon. By driving the stepping motor 11, the above swing arm 8 can be swung around a rotating shaft 8a.

A housing for storing therein the magnetic disk 1, the magnetic head 2, the swing arm 8, the steel belt 9 and the pulley 10 etc. is constructed of the above-described base plate 5 and a top cover (not shown). A gasket is employed in the contact portion between the base plate 5 and the top cover, and the mount portion of the stepping motor 11 so as to maintain the closed conditions. The shaft part of the DD motor 3 is filled with a magnetic fluid. A shutter 17 is mounted on the side 8b of the swing arm 8 opposite to the head mounting side thereof.

At the closed chamber side 5a of the base plate 5, a photointerruptor 18 is employed as an outside sensor. The above-described shutter 17 is positioned in such a manner that the shutter can be loosely inserted into an insertion path 18a of the photointerruptor 18. In the illustrated prior art, when the magnetic head 2 reaches the zero track position located in the outer circle of the magnetic disk 1, the photointerruptor 18 interrupts the optical path formed in the insertion path 18a of the photointerruptor 18.

During the zero track restore, the magnetic head 2 accesses at a lower speed and immediately stops at the zero track. Otherwise, if the magnetic head 2 is driven to access the zero track at a high speed, the head 2 cannot stop at the zero track.

Another conventional system in which neither optical detecting means such as the photointerruptor 18, nor mechanical detecting means is employed, is described in, for instance, European Patent Application 84308193.6 (Publication No. 0154085).

This prior art idea is characterized by setting:

a data track region essentially consisting of a plurality of information recording/reproducing tracks which are concentric circles in turn in the radial direction of the magnetic disk;

a guard band region essentially consisting of tracks only for reproducing information which are positioned at the outer circumference of the data track region; and a positional information region for determining whether or not the magnetic disk opposite position of the magnetic disk is located in the data track region or the guard band region at a part of each track of both the data track region and the guard band region. In addition, the reference track detecting means control a positioning motor to transport the magnetic head each track width in accordance with the positional information of the positional information region read by the magnetic head. Thereafter, the magnetic head is transferred to the data track region, and the O-th track is detected as the reference track by detecting a change of the positional information from the positional information of the guard band region to that of the guard band region.

When the power supply is turned off, the actual track position of the magnetic head is unknown. Accordingly, when restoring the head to the zero track, the following cases are present. In the first case, the magnetic head is always returned to the zero track, and the track counter is aligned with the head position by resetting the track counter in the drive. When the seek error occurs, the restoring operation is required to confirm the head position. Finally, the magnetic head is merely moved to seek the zero track. Anyway, a certain detecting means is required to detect the zero position. As such a zero track detecting means, there are the first-mentioned optical detecting means, and the magnetic detecting means which is suitable for seeking such a zero track by detecing the rotation angle of the stepping motor. According to these mechanical detecting means, the sensor must be provided adjacent to the transport region and the rotation region of the swing arm 8 and the stepping motor 11. As a result, even if a compact mechanism is required, it is practically difficult to mount the sensor on the above regions, which makes it difficult to manufacture a compact and slim mechanism. When the recording density becomes, on the other hand, high, severe precision in restoring to track zero is necessarily required. Since, as is known in the art, the resolution of the optical sensor is limited, the manufacturing cost is increased if the higher resolution is required.

Moreover, in the latter prior art where there are employed the data track region and the positional information region bridged over the guard band region, and the zero track is detected based upon the positional information added to this positional information region, it is necessary to inhibit the data from being written into the positional information region. If such an inhibit writ region is present in the radial direction of the magnetic disk, the data write region as to a single track is necessarily narrowed. Accordingly, the rotation speed of the magnetic disk must be lowered. If one is lowering the rotation speed, then the error rate becomes high.

The present invention is made in consideration of the above-defined conventional drawbacks, and has therefore an object to provide a zero track detecting method, whereby the rotation speed of the information recording disk can be maintained at a relatively high value, and also no zero track detecting device such as the optical detecting device and the mechanical detecting device is required.

SUMMARY OF THE INVENTION

To solve the problems of the prior art and accomplish the above object f the invention, the present invention is characterized by providing a method for detecting concentrically formed tracks of a disk-shaped information recordable medium by transporting a detection head along said tracks, said information recordable medium being rotated in a predetermined direction, said method comprising the steps of:

forming an information recorded region at least on a part of said concentrically formed tracks, into which data has been previously recorded;

forming an information non-recorded region on said tracks outside said information recorded region; and detecting a boundary position between said information recorded region from which said data is detectable, and said information non-recorded region from which said data is not detectable, whereby a position of the track from which said data is first of all detectable is assumed to be a zero track.

BRIEF DESCRIPTION OF THE DRAWINGS

The invention will be more readily understood with regard to the following description with reference to the accompanying drawings, in which.

DETAILED DESCRIPTION OF PREFERRED EMBODIMENTS

BASIC IDEA

Before describing various preferred embodiments of the invention, the present invention is realized based upon the following basic idea.

In a disk drive device, an information recording disk formed in a disk shape on which an information recording layer is formed, is rotated, and the magnetic head is transported by driving the head transport motor so as to record or reproduce the information on or from the information recording layer on the disk. To detect the zero track located at the outermost region of the information recording region on the information recording disk, the information recording disk includes:

circular recording regions where the data are previously recorded on at least a part of each track, the tracks being concentrically formed on the recording regions; and, circular non-recorded regions constructed of a plurality of tracks on which no data is written, and located at the outer side of the recording regions. The inventive method is to detect a boundary position between the data detectable recording regions and non-recorded regions from which no data is detected, wherein the track position of the recording regions from which the data is first detectable, is detected as the zero track.

According to the basic idea of the invention, since the data which is formed by, for instance, the reversed magnetization region and the like, has been previously written into at least a portion of the tracks located at the recording region, the recording region is clearly distinguishable from the non-recorded region on which the data, i.e., the reversed magnetization, is not recorded. Accordingly, first, the magnetic head is positioned at the non-recorded region that is located at the outermost part of the information recording medium. Thereafter, the head is transported inwardly to seek whether or not the data is present. Then, the first detected data can be understood as the "zero track" in a simple manner.

MAGNETIC DISK DRIVE DEVICE

Figure 1:
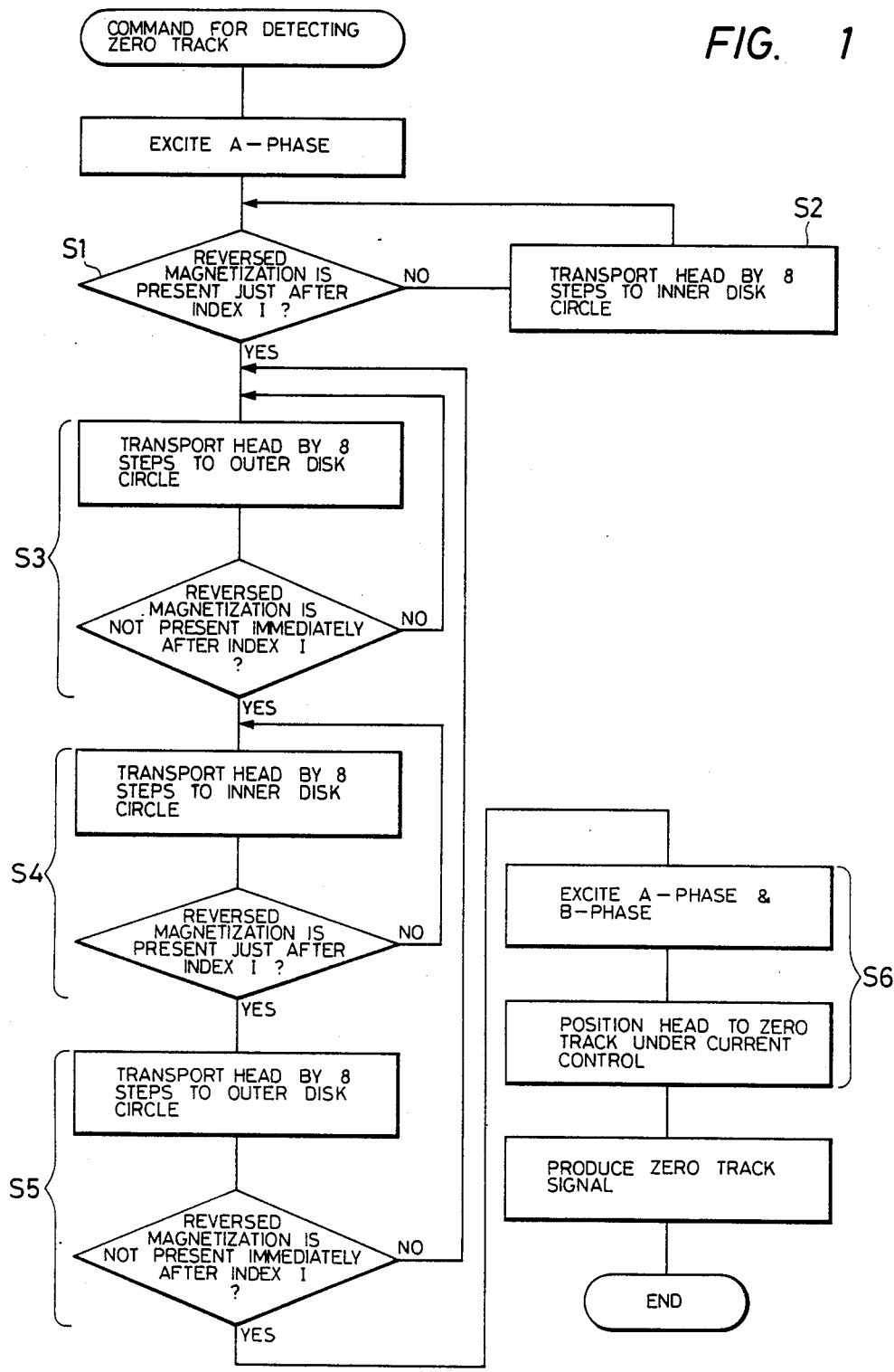
FIG. 1 is a flowchart for explaining the zero track detection according to the detecting method of the invention.
Figure 2:
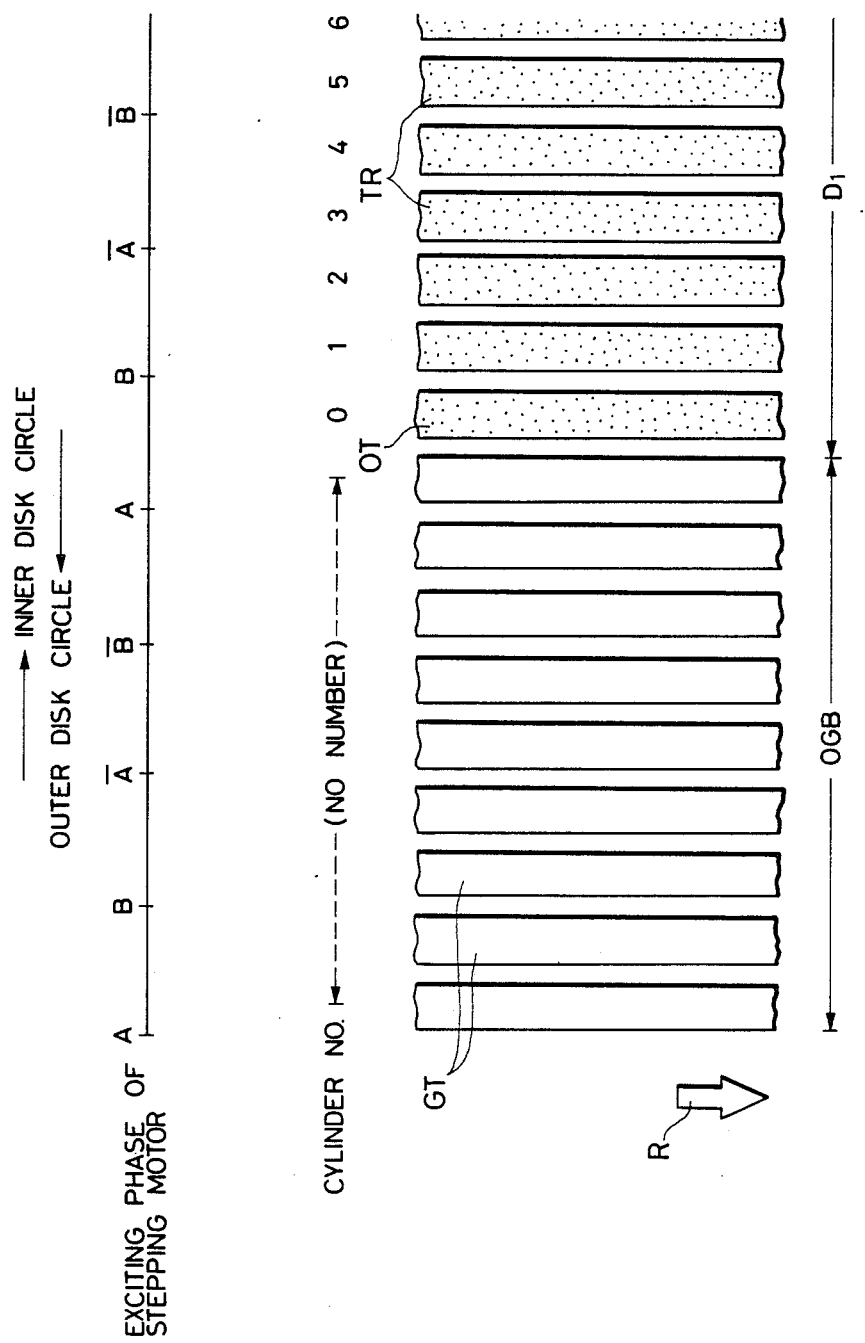
FIG. 2 illustrates schematically the tracks of a disk drive in accordance with the present invention.
Figure 3:
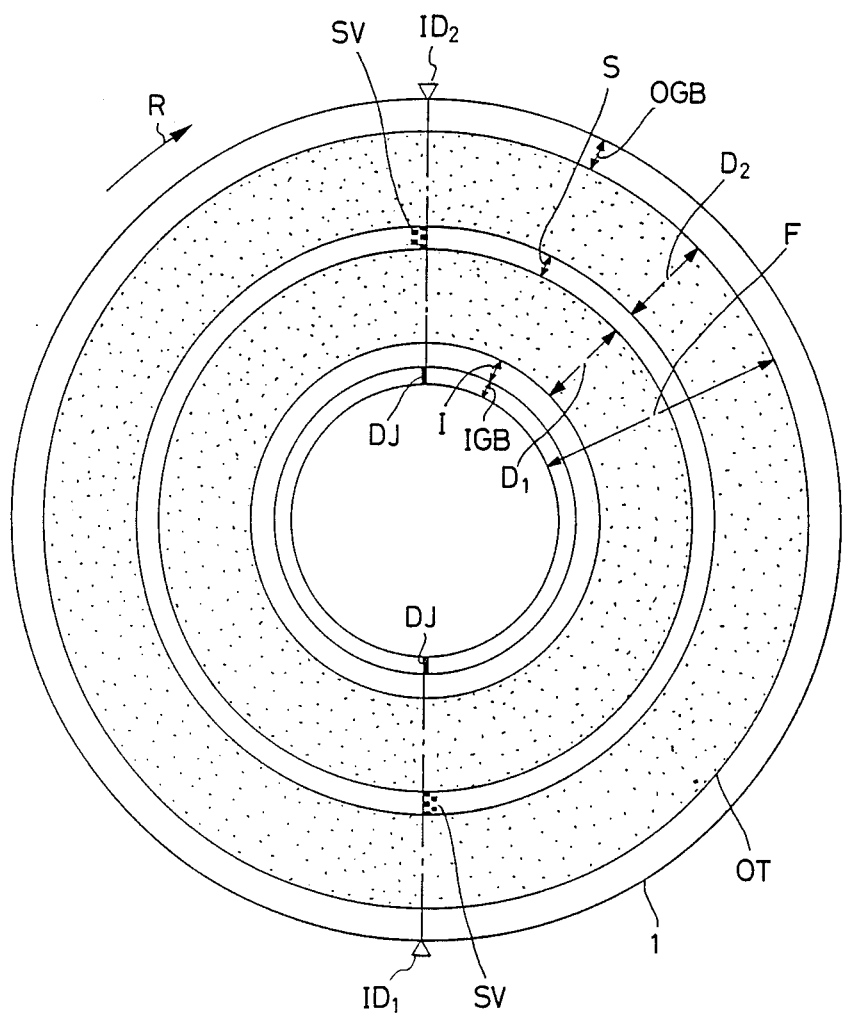
FIG. 3 schematically shows a magnetic disk including various tracks according to one preferred embodiment of the invention.

Referring now to FIGS. 1 to 3, a zero track detecting method according to one preferred embodiment of the invention will be described, which is applied to of the,: the magnetic disk drive device (see FIG. 4).

It should be noted that like reference numbers refer to like parts shown in the following figures.

DATA ZONES OF MAGNETIC DISK

Referring to FIG. 3, data zones of the magnetic disk 1 will now be described.

On the magnetic layer of the surface of the magnetic disk 1, a floating assurance region F is formed. The floating assurance region F is constituted from the inside region going outwards, an inner guard band IGB; an inhibit zone I on which no data is recorded; an inner data zone D1 on which the data is recoded; a servo zone SV into which the servo information is written; an outer data zone D2 on which the data is recorded; and an outer guard band OGB on which no data is recorded, and which is used as the non-recorded region. It should be noted that the outermost track of the data zone D2 corresponds to the zero track OT. The floating assurance region F of the magnetic disk 1 is subdivided into a large quantity of sectors in the radial direction. These sectors are formatted by a predetermined format. The known zigzag-shaped servo information SV is written in the area lower portion from the appearance of two indexes $ID_1$ and $ID_2$ in the rotation direction of the disk 1. Also, the discrimination information DJ is written into the respective tracks under these indexes $ID_1$ and $ID_2$ on the outermost inner guard band IGB in the rotation direction.

Both the servo information SV and the discrimination information DJ have been previously written into the above-defined positions on the magnetic disk 1, and moreover the data having the same frequency have been previously written into the respective recording tracks of the data zones $D_1$ and $D_2$ before the magnetic disk 1 is marketed. In other words, the reversed magnetization regions have been previously formed on the data zone before marketing the magnetic disk. As a result, no data is written at least on the respective-guard tracks GT (see also FIG. 2) of the outer guard band OGB, which implies that the reversed magnetization region is not formed on the guard tracks, but formed on the recording tracks $TR_1$ and data zones $D_1$ and $D_2$. These data zones $D_1$ and $D_2$ should be formatted by end users before its disk operation, so that the recording tracks TR of these data zones $D_1$ and $D_2$ continuously store the data which have been stored before, or during the formatting operation. This magnetization condition is different from that of the outer guard band OGB.

EXCITING PHASES OF STEPPING MOTOR

Figure 4:
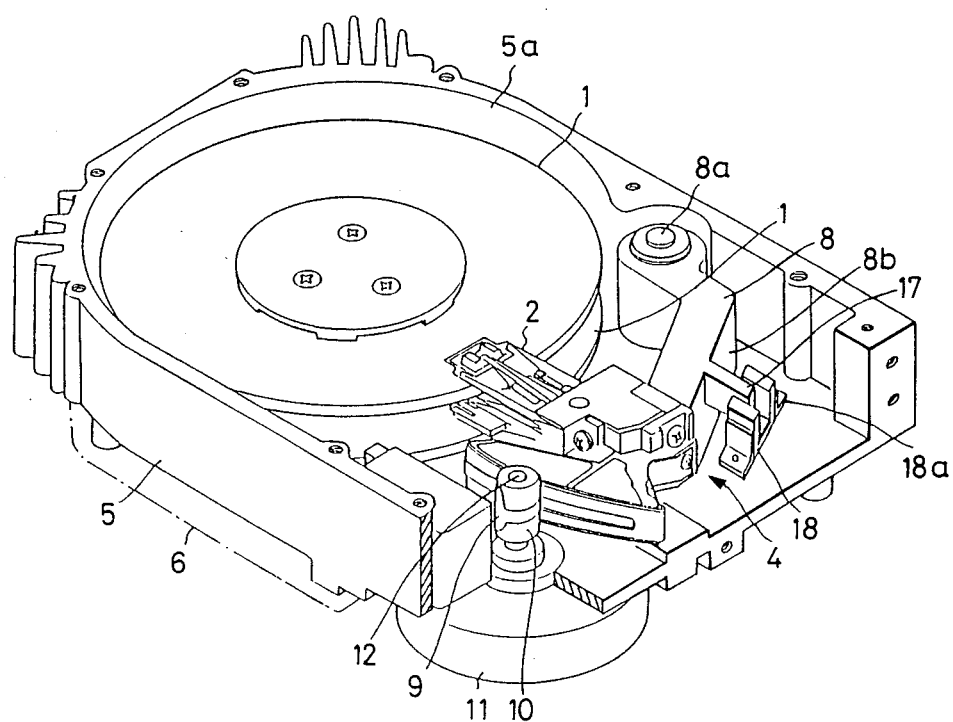
FIG. 4 is a perspective view of the conventional magnetic disk drive device.

The stepping motor 11 illustrated in FIG. 4 is a four phase unipolar-type stepping motor. In FIG. 2, the respective exciting phases of the stepping motor 11 are indicated by A, B, $\bar{A}$ and $\bar{B}$, respectively. In the following description, these A, B, $\bar{A}$ and $\bar{B}$-phases represent each of the exciting phases.

Since the stepping motor 11 is of the four-phase unipolar type, the motor advances by four steps by exciting 1-phase, and advances by more four steps by exciting 2-phase. That is, one cycle is subdivided into 8 (eight) steps.

ZERO TRACK DETECTION

Referring now to a flowchart illustrated in FIG. 1, zero track detection for the magnetic disk 1 will be described.

It should be noted that in this flowchart, 8 steps for one cycle are used as the operation basis of the stepping motor because of the four-phase unipolar type stepping motor. Accordingly, the stepping number of the stepping motor may be varied, depending upon the type and controlling system of the employed stepping motor.

In the flow control operation shown in FIG. 1, first, the A-phase is excited upon receipt of a command for detecting the zero track derived from the central processing unit (CPU) (not shown). In step $S_1$, a check is made whether or not the reversed magnetization region is present immediately after the indexes $ID_1$ and $ID_2$. In this step $S_1$, it is confirmed whether or not the magnetic head 2 is positioned on the data zones $D_1$, $D_2$ or the servo zone SV. Since the reversed magnetization region is only formed just after the indexes $ID_1$ and $ID_2$ in the servo zone SV, these indexes $ID_1$ and $ID_2$ are employed as the basis of the track detection.

If no reversed magnetization region is detected in the step $S_1$, it is recognized that the magnetic head 2 has been positioned on the outer guard band OGB, and then the magnetic head 2 is returned to the inner disk circle by 8 steps corresponding to one cycle of the stepping motor (in step $S_2$). Then, a judgement is again performed in step $S_1$.

If the reversed magnetization region is detected in this step $S_1$, a decision is made that the magnetic head 2 is now positioned at least on the data zones $D_1$, $D_2$, or the servo zone SV. Therefore the magnetic head 2 is transported to the outer disk circle by 8 steps so as to judge whether or not the reversed magnetization region exists (step $S_3$). If no reversed magnetization region is detected in step $S_3$, a judgement is made that the magnetic head 2 is located on the outer guard band OGB, and thus, the magnetic head 2 is again returned to the inner disk circle by 8 steps. At the inner disk circle, the reversed magnetization region is detected (in step $S_4$).

If no reversed magnetization region is detected in this step $S_4$, it is understood that the magnetic head 2 is still on the outer guard band OGB, and thus transported to the inner disk circle by 8 steps so as to detect the reverse magnetization region. If the reverse magnetization region is detected in the step $S_4$, it is recognized that the magnetic head 2 is located at the position within one cycle of the stepping motor from the zero track OT. The magnetic head 2 is again transported to the outer disk circle by 8 steps in order to check existence of the reversed magnetization region (step $S_5$) If the existence of the reversed magnetization region is detected in this step $S_5$, the magnetic head 2 is not present at the outer guard band OGB and therefore is returned to the above flow operation at the step $S_3$ where the outer guard band OGB is again checked. If, on the other hand, the reversed magnetization region is not detected in the step $S_5$, it is assured that the magnetic head 2 is located at the position within one cycle of the stepping motor 11. Then, the A and B-phases corresponding to the zero track position OT are excited, and the currents flowing through the respective A and B-phases are fine adjusted on the basis of the data values which have been stored in a RAM table (not shown) in accordance with, for instance, the above-described servo information SV, so that the magnetic head 2 is correctly positioned on the fine track position of the zero track OT (step $S_6$). Thereafter, a signal representative of the zero track positioning is sent to the CPU, thereby completing the zero track detection and the zero track restoring operation.

It should be understood from the above flowchart operation that up to the step $S_3$, the magnetic head 3 is positioned to the outer guard band OGB, and in both the succeeding step $S_4$ to seek the track by transporting the magnetic head 2 to the inner disk circle by 8 steps of the stepping motor 11, and also the step $S_5$, a check is again made whether or not the boundary between the data zone $D_1$ and the outer guard band OGB is present within the 8 steps of one cycle of the stepping motor 11. In the final step $S_5$, the zero track position is correctly detected.

In accordance with the above-described preferred embodiment, the zero track detection can be correctly performed by such a simple manner that the data is previously written into the data zones $D_1$ and $D_2$ of the magnetic disk 1 in the reversed magnetization form, but such reversed magnetization data is not written into the outer guard band OGB, and the zero track seek operation is carried out based upon the flowchart shown in FIG. 1. As a result, the photo interruptor 18 and the shutter 17 mounted on the swing arm 8 employed in the conventional disk device are no longer required. Moreover, since the data can be written over the entire track circle, it is not necessary to reduce the rotation speed of the magnetic disk 1 which is performed in the prior art disk device.

Further, it is evident to those skilled in the art that other modifications can be easily conceived without departing from the technical spirit and scope of the present invention.

For instance, the hard disk device was employed in the previous preferred embodiment. However, the zero track detecting method according to the present invention is not limited to such a type of magnetic disk device, and therefore is applicable to various types of disk drive devices which employ information recording media for writing the data plural times thereon. Moreover, depending upon the types of drive motors, various controlling systems may be utilized.

While the present invention has been described, the particular advantage of the present invention will now be summarized.

According to the zero track detecting method of the present invention, the data is previously written into the recording region but no data is written into the non-recorded region located outside the recording region. Then the recording track from which the data is first detected is sought as the zero track while driving the magnetic head from the non-recorded region. Consequently, the following merits are provided.

(1). Since the mechanical position detecting means for the zero track position is no longer required, compact and slim disk drive devices can be realized.

(2). As previously described, there is a limitation in high density because the resolution of the mechanical means is inherently restricted. To the contrary, the sufficient high density can be achieved by employing the electronic detecting means according to the invention.

(3). There is very small risk that the control precision and the reliability will deteriorate due to aging effects since the electronic detecting means is employed.

(4). Since no mechanical arrangement is required, the zero track positioning mechanical components can be omitted and thus, the total number of the component parts can be considerably reduced, resulting in a low cost device.

(5). As the data can be written over the entire circular track, the rotation speed of the information recording disk need not be lowered. Consequently, the error rate can be reduced.

What is claimed is:

1. A method for detecting a zero track of a plurality of concentrically formed tracks on a disk-shaped recordable medium by transporting a detection head along the medium by means of a stepping motor having at least two excitable phases, the recordable medium being rotated in a predetermined direction and having at least one index mark on each track, the method comprising the steps of:
    (a) forming a recorded region at least on a part of the concentrically formed tracks, onto which data has been previously recorded;
    (b) forming a non-recorded region on tracks outside the recorded region;
    (c) exciting a first phase of the stepping motor so as to transport the detecting head to a track;
    (d) detecting by means of the detecting head if data has been recorded immediately after an index mark on the track, and if data has been recorded proceeding a step(e) otherwise if data has not been recorded transporting the head inwards towards the center of the medium and repeating this step;
    (e) transporting the head outwards from the center of the medium by a certain number of steps of the stepping motor to a track;
    (f) detecting by means of the head if data has been recorded immediately after an index mark on the track of step (e), and if data has not been so recorded proceeding a step(g) otherwise if data has been so otherwise recorded, returning to step (e);
    (g) transporting and the head inwards by a certain number of steps of the stepping motor to a track;
    (h) detecting by means of the detecting head if data has been recorded immediately after an index mark on the track of step (g), and if data has been so recorded proceeding to a step(i) otherwise if data has not been so recorded, returning to step (g);
    (i) transporting the head outwards by a certain number of steps of the stepping motor to a track;
    (j) detecting by means of the detecting head if data has been recorded immediately after an index mark on the track of step (i), and if data has not been so recorded proceeding to a step (k) otherwise if data has been so recorded, returning to step (e);
    (k) exciting both phases of the stepping motor simultaneously so as to position the head over the track of step (i); whereby the track of step (i) is the zero track.

2. A method as claimed in claim 1, wherein said data is recorded on said recorded region in a reversed magnetization form.

3. A method as claimed in claim 1, wherein the recorded region is at least a data zone, and the non-recorded region is an outer guard band.

* * * * *

UNITED STATES PATENT AND TRADEMARK OFFICE
CERTIFICATE OF CORRECTION

PATENT NO. : 4,876,618

DATED : October 24, 1989

INVENTOR(S) : Jun Ide, Tomoo Iizumi, Yoshitaka Takahashi,
Hiroshi Yoshida, Tooru Kaneko and Yuuichi Hishi It is certified that error appears in the above-identified patent and that said Letters Patent is hereby corrected as shown below:

On the title page:

Inventors missing - --Yoshitaka Takahashi, Hiroshi Yoshida, Tooru Kaneko and Yuuichi Hishi--

Signed and Sealed this

Twenty-sixth Day of February, 1991

Attest:

HARRY F. MANBECK, JR.

*Attesting Officer*      *Commissioner of Patents and Trademarks*